March 18, 1958  J. BEIER  2,826,935
AUTOMATIC VARIABLE EPICYCLIC FRICTION DRIVE
Filed Oct. 26, 1954  6 Sheets-Sheet 1

Inventor:
Josef Beier

By:
Michael S. Striker
agt.

March 18, 1958  J. BEIER  2,826,935
AUTOMATIC VARIABLE EPICYCLIC FRICTION DRIVE
Filed Oct. 26, 1954  6 Sheets-Sheet 2

Inventor:
Josef Beier

By:
Michael S. Striker
agt.

March 18, 1958  J. BEIER  2,826,935
AUTOMATIC VARIABLE EPICYCLIC FRICTION DRIVE
Filed Oct. 26, 1954  6 Sheets-Sheet 3

Inventor:
Josef Beier

By:
Michael S. Striker
agt.

Inventor:
Josef Beier

March 18, 1958  J. BEIER  2,826,935
AUTOMATIC VARIABLE EPICYCLIC FRICTION DRIVE
Filed Oct. 26, 1954  6 Sheets-Sheet 5

Inventor:
Josef Beier
By:
Michael S. Striker
agt.

March 18, 1958      J. BEIER      2,826,935
AUTOMATIC VARIABLE EPICYCLIC FRICTION DRIVE
Filed Oct. 26, 1954      6 Sheets-Sheet 6

Inventor:
Josef Beier
By:
Michael S. Striker
agt.

United States Patent Office 2,826,935
Patented Mar. 18, 1958

2,826,935
AUTOMATIC VARIABLE EPICYCLIC FRICTION DRIVE

Josef Beier, Sarnen, Switzerland; Alice Beier, nee Siegenheim and Regine Beier, both of Karlsruhe, Germany, and Hans Herbert Beier, East Boldon, England, heirs of the estate of said Josef Beier, deceased Application October 26, 1954, Serial No. 464,707
Claims priority, application Germany December 28, 1953
19 Claims. (Cl. 74—752)

The present invention relates to variable friction drives, and more particularly to a gradually variable automatic epicyclic friction drive controlled by centrifugal means.

Epicyclic friction drives are known in which all wheels of the epicyclic train are constructed as friction discs. Friction drives of this type, however, are not suitable for use as automatic drives in motor cars since they require too much space, have a great weight, and low efficiency.

It is one object of the present invention to overcome the disadvantages of the known variable friction drives, and to provide a gradually variable automatic epicyclic friction drive of compact construction, high efficiency, and low weight.

It is another object of the present invention to provide an automatic friction drive whose transmission ratio is automatically adjusted depending on the rotary speed of the apparatus.

It is a further object of the present invention to provide an epicyclic friction drive employing a planetary means which partly consists of planetary friction discs and partly consists of planet gears so that one effective radius is gradually variable for changing the transmission ratio, while the other effective radius is the radius of the planetary gear and remains constant.

It is still a further object of the present invention to provide an outer orbit gear meshing with the planetary gears, and to provide means for blocking rotation of the outer orbit gear in one direction.

It is still another object of the present invention to provide means for coupling the orbit gear with the rotary drive means when a predetermined speed is reached whereby a direct drive is obtained in which the friction discs remain in engagement but do not move relative to each other. Consequently, the wear of the friction discs is reduced, and their dimensions can be made so small that the friction drive is suitable for use in vehicles.

It is yet another object of the present invention to provide an automatic variable transmission for motor cars in which rotary elements of the transmission are used as fly wheel means.

It is also an object of the present invention to provide a gradually variable automatic drive whose transmission ratio is automatically changed according to a linear function as the rotary speed changes.

It is yet an object of the present invention to provide centrifugal weight means and return springs counteracting the centrifugal force for automatically operating the variable transmission of the present invention.

With these objects in view, the present invention mainly consists in gradually variable epicyclic friction drive comprising, in combination, first rotary means; second rotary means, sun friction disc means connected for rotation to the first rotary means; planetary friction disc means meshing with the sun friction disc means; shiftable supporting means supporting the planetary friction disc means on the second rotary means spaced from the axis of rotation of the same and shiftable with respect to the sun friction disc means for gradually changing the ratio of transmission between the sun friction disc means and the planetary friction disc means; transmission means connected for rotation to the planetary friction disc means and including an orbit gear means; blocking means for blocking rotation of the orbit gear means; and movable operating means connected to the movable supporting means for shifting the same whereby the ratio of transmission between the sun friction disc means and the planetary friction disc means is changed in accordance with the rotary speed of the second rotary means.

Preferably, the second rotary means are driven by an engine, and the first rotary means are connected to the wheels of a vehicle.

The operating means preferably include centrifugal weight means and return spring means connected to the centrifugal weight means and urging the same in inward direction. At a predetermined rotary speed of the second rotary means the centrifugal weight means are pressed by centrifugal force against the orbit gear means so that the same is coupled to the second rotary means which may be the drive means, in a direct drive.

According to a preferred embodiment the transmission means consists of planet gear means connected to the planetary friction disc means for rotation therewith and internal gear means on the orbit gear wheel means meshing with the planet gear means.

Preferably, the movable operating means include a turnable cam means formed with a cam slot engaged by a cam follower which is shifted by the centrifugal means. Consequently, movement of the centrifugal weight means results in turning of the cam means, which are connected to the movable supporting means of the planetary disc friction means whereby the position of the planetary friction disc means with respect to the sun friction disc means is adjusted.

Preferably, the planetary friction discs are conical discs, and the sun disc means have friction rims engaging the conical side faces of the planetary friction discs. Shifting of the planetary friction discs in substantially radial direction will therefore result in a variation of the effective radius of the conical friction discs and in a change of the transmission ratio. Of course, it is also possible to provide conical sun friction discs, and friction rims on the planetary friction discs.

The operating means automatically vary the transmission ratio in accordance with the rotary speed. Preferably, the return spring means acting on the centrifugal weight are pretensioned so that at small rotary speeds no action of the centrifugal weights takes place. The rotary speed at which the centrifugal weights become effective can be determined by suitably choosing the amount of pretensioning of the return spring. The rate of increase of the centrifugal force after the force of the return springs has been overcome is determined by suitably choosing the weight of the centrifugal weight means. During an operational period in which the rotary speed is reduced, the return springs exert the actuating force on the control mechanism and adjust the transmission ratio to the prevailing conditions.

Due to the fact that the combined force of the return springs and of the centrifugal weight is transmitted through a cam follower and a cam slot, the operating means are effective not only during an increase of the rotary speed but also during a decrease of the rotary speed. During outward movement of the centrifugal weight means, the outer edge of the came slot acts as cam track, and during inward movement the inner edge acts as cam track. The transmission ratio can be varied according to a predetermined function by suitable shaping of the cam slot.

According to a preferred embodiment of the present invention, the movable supporting means of the planetary friction discs are lever means supporting planetary shafts and having arms connected to the turnable came means and pivoted by the same. Consequently, a plurality of planetary shafts is shifted simultaneously and to the same extent by the operating means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
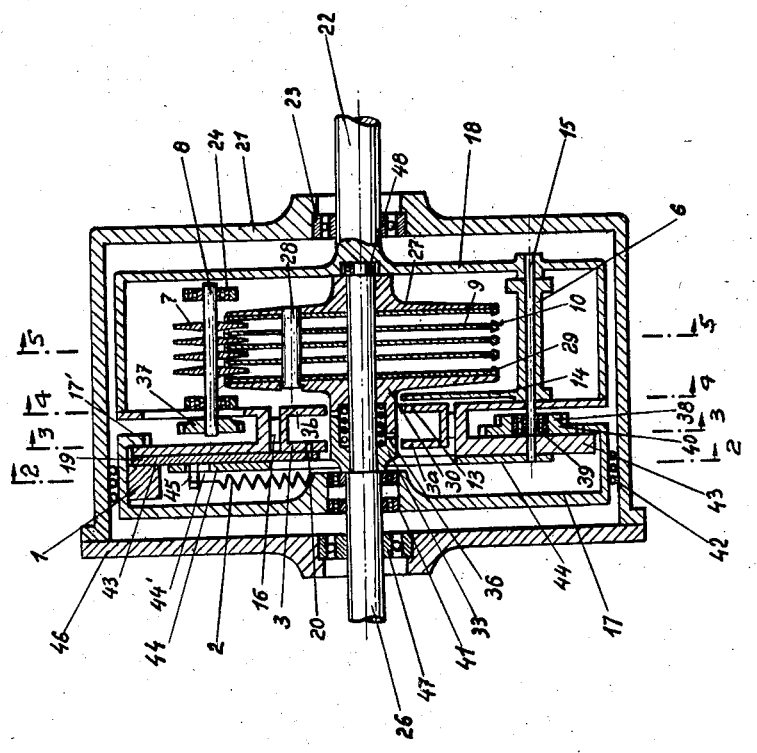
Fig. 1 is an axial sectional view taken on line 1—1 in Fig. 2.

Referring now to the drawings, and more particularly to Fig. 1, the casing 21 of the apparatus may be attached to the engine or to the frame of a motorcar. The friction drive according to the present invention is mainly intended for use with a vehicle, and the drive shaft 22 of the drive may be driven by the engine of a motorcar. The drive shaft 22 is rotatably mounted in the casing 21 by means of ball bearing 23. A rotary means 18, which at the same time serves as a flywheel, is fixed to the drive shaft 22 and constitutes together with the same drive means for the apparatus.

The driven rotary shaft means 26 is shown to be coaxial with the drive shaft 22 and is mounted in a ball bearing 48 in the drive shaft 22 and in another ball bearing 47 in the casing part 46.

Figure 4:
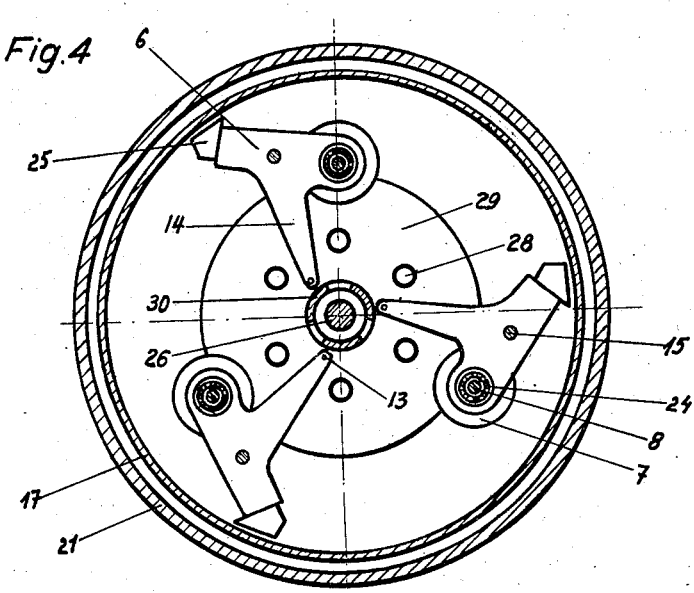
Fig. 4 is a cross-sectional view taken on line 4—4 in Fig. 1.
Figure 5:
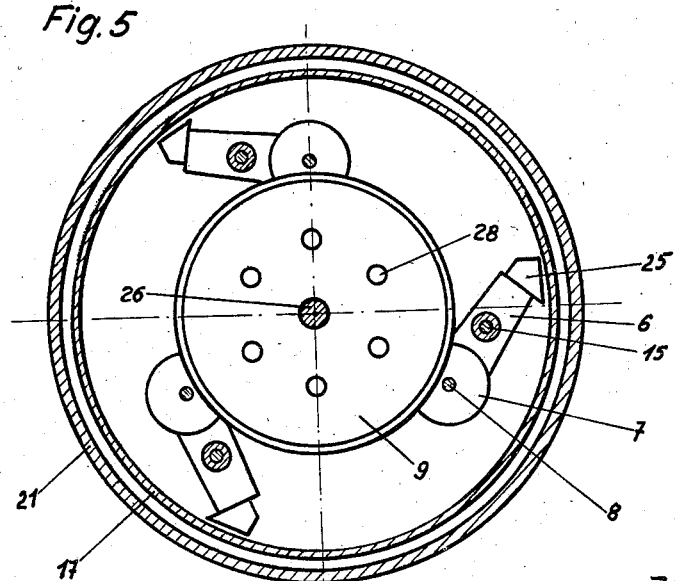
Fig. 5 is a cross-sectional view taken on line 5—5 in Fig. 1.
Figure 8:
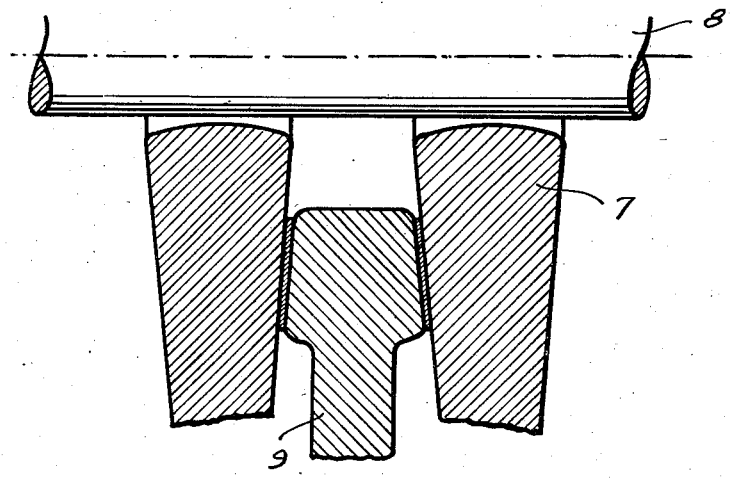
Fig. 8 is a fragmentary axial sectional view of a detail.
Figure 9:
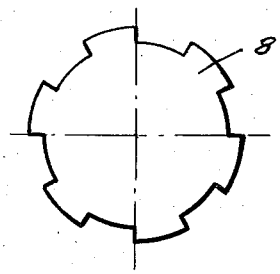
Fig. 9 is a side view illustrating a detail.

Pins 15 are fixedly secured to the rotary means 18 and turn with the same. Movable supporting means for the friction discs 7 are mounted on the pins 15. In the illustrated embodiment, the movable supporting means are forked levers 6, best seen in Fig. 4, which are pivotally mounted on the pins 15. The levers 6 are provided with ball bearings 24 turnably supporting the planetary shafts 8 on which the conical friction discs 7 are mounted. The planetary shafts 8 have grooves and projections as illustrated in Fig. 9, and the central bores in the conical friction discs 7 have the same shape as the shafts 8 so that they are connected for rotation to shafts 8 but are slidable in axial direction. The central bores in the friction discs 7 are so dimensioned as to have ample play on the shafts 8, and preferably are bounded by arcuate convex surfaces as illustrated in Fig. 8. This construction prevents a jamming of the friction discs since they can easily slide on shaft 8 and even assume a slightly oblique position which may be necessitated by inaccuracies occurring during manufacture. In the illustrated embodiment, three planetary shafts 8 are provided but it will be understood that two, or even one planetary shaft 8 would be sufficient for obtaining the result of the present invention.

Each pivoted supporting lever 6 has an arm which carries a centrifugal weight 25 which compensates the centrifugal force acting on the friction discs 7 during rotation. The centrifugal weights 25 are so dimensioned that their centrifugal force is greater than the centrifugal force produced by the friction discs 7 so that the levers 6 tend to pivot in clockwise direction during rotation so that the friction dics 7 are pressed into engagement with the friction discs 9 by a force which increases with the rotary speed of the drive shaft.

The friction discs 9 are connected for rotation to the driven shaft 26, as will be described hereinafter. The friction discs 9 have conical friction rims frictionally engaging the lateral conical friction faces of the friction discs 7 as best seen in Fig. 8. It will be understood that the effective radius of the friction discs 7 varies as the friction discs 7 are moved in radial direction into and out of the spaces between the friction discs 9.

The driven shaft 26 carries a sleeve-shaped wedge means 33 which is fixedly secured thereto and is provided with a plurality of claws 34 which have wedge faces 35. The wedge means 33 cooperates with another wedge means 30 which also has claws 31 provided with wedge faces 32. The wedge means 30 is turnably mounted on the driven shaft 26 and is slidable in axial direction thereon. A movable pressure member 29 is fixedly connected to the movable wedge means 30, and preferably integral therewith. Another pressure member 27 is mounted on shaft 26 non-movable in axial direction. Pins 28 are fixedly secured to the pressure member 27 and project through bores in the friction discs 9 into bores in the pressure member 29. The friction discs 9 are mounted on the pins 28 with play and slide on the same when the pressure member 29 moves in axial direction. A spring 36 is arranged between the sleeve-shaped wedge means 30 and 33, and urges the movable pressure member 29 to the right in Fig. 1. The pressure exerted by the pressure member 29 on the friction discs 9 must be sufficient to produce the contact pressure required between the friction discs 9 and 7 for transmitting the load. While the spring pressure is sufficient for idle operation, the wedge means 30 and 33 are required for adapting the pressure to a higher load. The wedge faces 32 and 35 engage each other during rotation, and the torque produces an axial force component which urges the pressure member 29 to increase the frictional pressure between the friction discs. It will be understood that the axial pressure component depends on the torque and therefore on the load. This arrangement, however, is not an object of the present invention.

Figure 3:
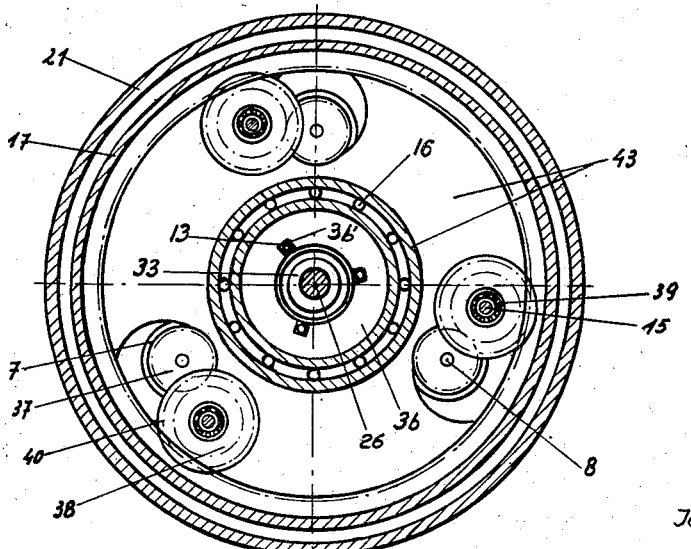
Fig. 3 is a cross-sectional view taken on line 3—3 in Fig. 1.

Each planetary shaft 8 carries a fixed planet gear 37 which meshes with a gear 38 which is mounted on the associated pin 15 by means of a ball-bearing 39. This construction is best seen in Fig. 3 from which it will be understood that the gear 37 rolls on the gear 38 when the supporting lever 6 is pivoted about the pin 15 as required for changing the transmission ratio between the friction discs 7 and 9.

The gear 38 is fixedly connected to or integral with a gear 40 which meshes with an internal gear 17' on an orbit gear means 17 which is mounted on the driven shaft 26 on a ball-bearing 41.

The gears 37, 38, 40 and 17' constitute a transmission means connecting the planetary friction discs 7 with the orbit gear means 17.

The orbit gear means 17 has the shape of a brake drum and co-operates with a flexible brake band 42, illustrated to consist of parallel wires. The brake arrangement is of a well known free-wheel type in which the brake band means 42 permits rotation of the brake drum 17 in one direction but brakes and stops the brake drum 17 when the same tends to rotate in the opposite direction.

From the above description it will be understood that the friction discs 9 operate like the sun gear of an epicyclic train, that the friction discs 7 and the gears 37, 38 and 40 operate as planetary means, and that the internal gear 17' completes the epicyclic train as an orbit gear. As compared with an epicyclic gear train, the construction of the present invention includes a variable friction transmission 7, 9 whose ratio of transmission may be changed by turning the supporting levers 6 so as to move the conical friction discs 7 into and out of the spaces between the friction discs 9.

The variable epicyclic friction transmission according to the present invention operates in the following manner:

When the rotary drive means 18 which serves as a fly wheel and as a spider carrying the planetary shafts 8 and 15, is turned in counterclockwise direction as seen in the cross-sections of Figs. 2–5, the planetary gears 38 and 40 rotate in clockwise direction and, if the orbit gear 17 is blocked, turn the gears 37 counterclockwise so that the shafts 8 and the planetary friction discs 7 rotate in counterclockwise direction. Consequently, the points of the conical planetary friction discs 7 which engage the rims 10 of the sun friction discs 9 move in a direction opposite to the direction of the movement of the rotary means 18. The absolute speed of this point is the difference between the speed of the respective shafts 8 and the speed of the engaging point of the respective friction disc 7 which point moves in opposite direction as described above. The speed of the engaging point I depends on the effective radius of the friction discs 7. When the effective radius X is small, the speed of the shaft 8 is greater than the opposite speed of the engaging point I which transmits the motion to the friction discs 9. This operational condition is illustrated on the left of Fig. 10. Since the engaging point I moves with the shafts 8 in this condition of the transmission, the friction discs 9, and the shaft 26, turn in the same direction as the rotary means 18 which corresponds to forward drive.

If the effective radius X of the friction discs 7 is increased by shifting the supporting levers 6, the speed of the peripheral rim portions of the friction discs 9 is reduced, since the rearward components of the speed transmitted by the engaging point I of the friction discs 7 increases with the effective radius. At a certain effective radius $X_0$ the difference between the speed of the shaft 8 and the opposite speed of the engaging point I is zero, so that the points I do not move relative to the friction rims 10 of the friction discs 9 although the rotary means 18 and the friction disc 7 turn. Consequently, the friction discs 9 are not driven in this position which is illustrated in the center portion of Fig. 10.

Figure 10:
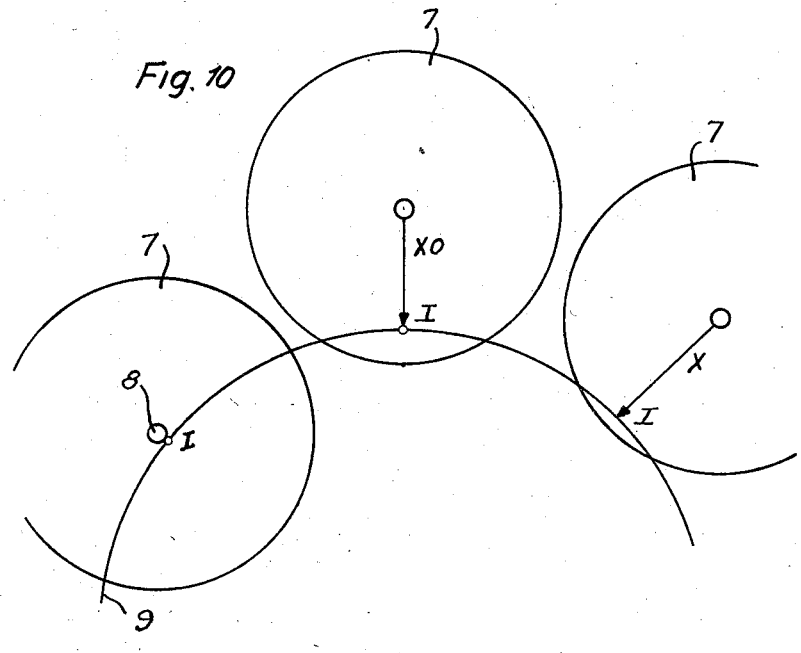
Fig. 10 is a schematic view illustrating three operational positions of friction discs applied in the present invention.

When the shafts 8 are further retracted by the supporting levers 6 so that the effective radius of the friction discs 7 is increased beyond the value $X_0$, as illustrated on the right side of Fig. 10, the speed of the engaging points I of the friction discs 7 due to the rotation of the friction discs 7 about the shaft 8 is greater than the speed of the engaging points I due to the movement of the shafts 8 together with the rotary means 18 so that the engaging points, and therewith the friction wheels 9 start moving in clockwise direction, that is in a direction opposite to the rotation produced in the position of the friction discs illustrated on the left side of Fig. 10.

These conditions may be mathematically expressed by the following equation:

$$T = 1 - \frac{X \cdot r17 \cdot r38}{R9 \cdot r37 \cdot r40}$$

$T$ = transmission ratio between drive shaft and driven shaft.
$X$ = the variable effective radius of the conical friction discs 7.
$R9$ = the radius of the friction rim of the friction discs 9.
$r17$ = the radius of the internal gear 17.
$r37$ = the radius of the gear 37.
$r38$ = the radius of the gear 38.
$r40$ = the radius of the gear 40.

The value $$\frac{r17 \cdot r38}{R9 \cdot r37 \cdot r40}$$

is constant and known so that the transmission ratio may be expressed by the equation:

$$T = 1 - X \cdot K$$

An analysis of the above equation proves that the shaft 26 rotates in the same direction as the rotary means 18 and the drive shaft 22 when the second element on the right side of the equation is smaller than 1. If this element is greater than 1, the driven shaft 26 rotates in a direction opposite to the rotation of the drive shaft 22 and the rotary means 18. When $X \cdot K$ equals 1, the driven shaft 26 is at a standstill. The equation also shows the transmission ratio as a linear function of the effective radius X of the friction discs 7.

The pins 15 which carry the supporting levers 6 and the gears 38 and 40, are extended to project into bearing bores in a flange 43 which is integral with the rotary means 18.

Figure 6:
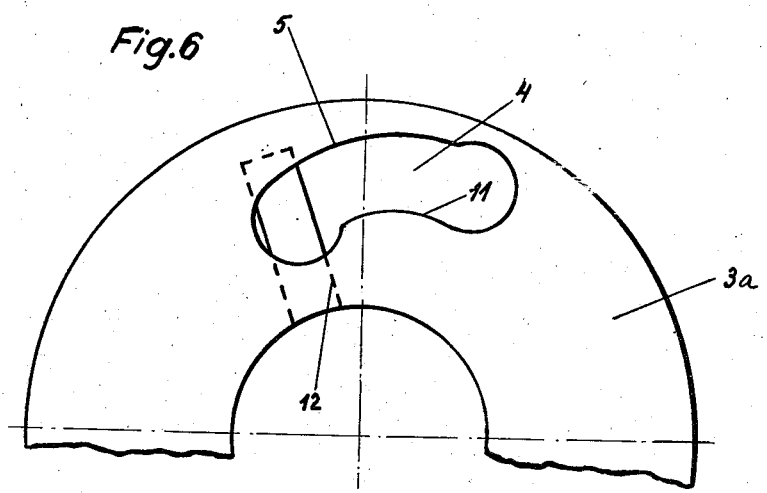
Fig. 6 is a fragmentary view of a detail.
Figure 7:
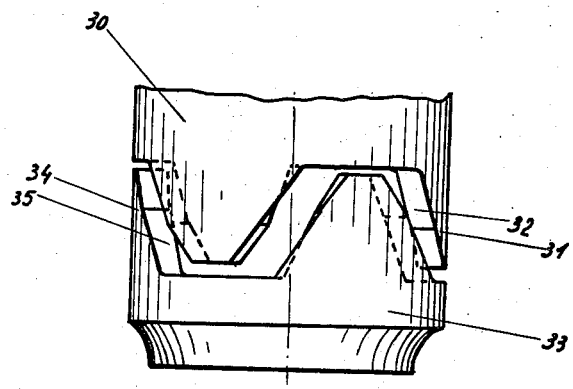
Fig. 7 is a fragmentary side view showing a detail.

Flange 43 supports centrifugal weight means for turning the supporting levers 6 between the positions shown in Fig. 10 on the left side and on the right side, respectively. The centrifugal weight means include weight 1 and guide members 19 which are guided in guide means including the radially extending grooves 43' in the flange 43. An annular disc 44 is secured to the face of the flange 43 which is formed to the grooves 43' and closes the grooves so that the guide members 19 are enclosed. Springs 2 are secured to bolts 45 which are fixed on guide members 19 and pass through slots 44' in the annular disc 44. Cam followers consisting of pins provided with rollers 20 are secured to the inner ends of the guide members 19 and project into cam slot 4, see Fig. 6, of an annular cam means 3 which has U-shaped cross-section, as best seen in Fig. 1. The annular cam means 3 is composed of a ring and of two flanges 3a and 3b, the flange 3a having the cam slots 4. The flange 3b is provided with radial slots 3b' in which slide members 13 are guided. Members 13 are carried by the arms 14 of the supporting levers 6, see Fig. 4. The annular cam means 3 is mounted in ball-bearings 16 within the rotary means 18, 43.

Figure 2:
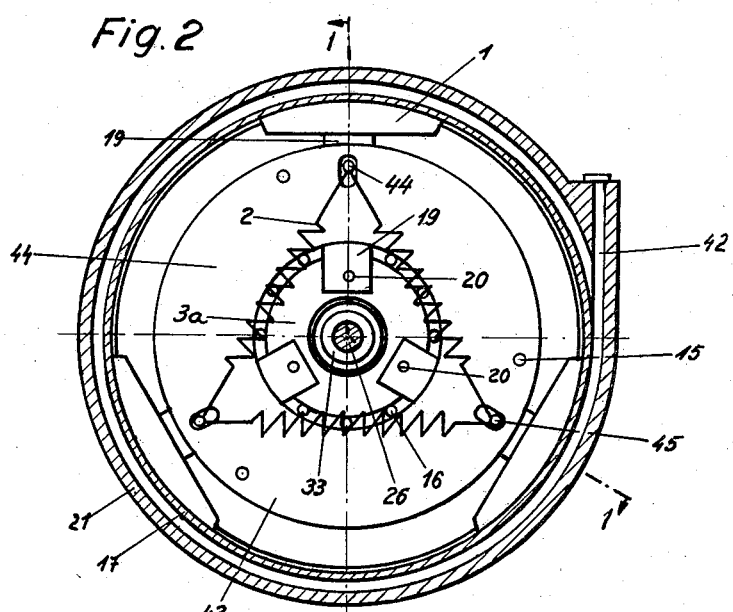
Fig. 2 is a cross-sectional view taken on line 2—2 in Fig. 1.

The centrifugal means 1, 19 tend to move in outward direction during rotation into a position in which the weights 1 engage the inner annular face of the brake drum 17. As best seen in Fig. 2, the weights 1 are segment shaped friction members having arcuate friction faces for engaging the inner cylindrical face of the brake drum 17.

The springs 16 urge centrifugal weight means 19 and 1 inwardly, so that the position of the guide members 19 depends on the rotary speed of the rotary means 18, 43. The annular cam means 3 is turned by the cam followers 20 when the same move in radial direction due to the action of the centrifugal weight means 1, 19, or inwardly due to the action of the springs 2. During the outward movement of the cam followers 20, the associated rollers ride on the cam track 5, while during the inward movement the cam track 11 is engaged by the same. When the annular cam means is turned by the pressure of the cam followers 20, the lever arms 14 also turn with the member 3 so that all supporting levers 6 are simultaneously pivoted to shift the friction wheels 7 for changing the transmission ratio.

From the above description it will be apparent that members 1, 19, 2, 20, 3 and 14 constitute operating means for turning the levers 6 and shifting the planetary friction discs 7.

The operating means operate as follows:

When the rotary means 18 rotate in counterclockwise direction together with the supporting levers 6 at idle speed, the return spring means 2 exert a stronger force than the centrifugal force, and the annular member 3 is turned into a position in which the movable supporting means 6 hold the friction discs 7 in their outermost position corresponding to a maximum effective radius X, as shown on the right side of Fig. 10. In this position the engaging points of friction discs 7 tend to turn the friction discs 9 in clockwise direction, as previously described.

Assuming that the vehicle is at a standstill, the driven shaft 26 and the friction discs 9 are also at a standstill and offer considerable resistance against turning so that the planetary discs 7, and the internal gear 17' turn in counterclockwise direction in which the one way brake 42 permits turning.

When the rotary speed of the drive shaft 22 is increased by accelerating the engine, the centrifugal force acting on the centrifugal means 19, 1 increases so that the pins and rollers 20 ride along the cam track 5 of the cam slot 4 in the flange 3a of annular member 3 and turn annular member 3. Consequently, the supporting levers 6 are pivoted, and move the friction discs 7 inwardly so that the effective radius X becomes smaller until a position is reached corresponding to the effective radius $X_0$ in which the rotary speeds of the rotary means 18 and of the friction discs 7 compensate each other so that the gears 37, 38 and 40 do not turn. Thereupon, the internal gear 17' tends to change its direction of rotation. Since the one-way brake 47 prevents turning of the drum 17 in opposite clockwise direction, the internal orbit gear 17' is blocked. Consequently, the gears 40 roll on the internal gear 17', and the friction discs 7 turn the friction discs 9 and thereby the driven shaft 26. The vehicle is accelerated, and as the rotary speed is further increased, the friction discs move inwardly into the space between the friction discs 9 while the transmission ratio approaches 1:1.

By suitably shaping the cam slot 4 the rate of acceleration can be adjusted as desired. For instance, it is possible to adapt the transmission ratios to the loads so that a minimum fuel consumption is obtained at all loads.

When the transmission ratio has reached a value which is about 15% to 20% different from the value 1:1, the friction discs 7 are in a position in which the effective radius X is a minimum, as shown in the left portion of Fig. 10. In this position, the slide members 13 have turned the annular member 3 so far that the cam follower 20 is in its outermost position and reaches a recessed portion in the cam track 5. When the edge of the recessed portion is reached by the roller 20, the centrifugal force acting on the centrifugal weight means 1, 19 exerts an additional torque by which all supporting levers 6 and thereby all friction discs 7 are further inwardly shifted so that the minimum effective radius is obtained. At the same time the friction faces of weights 1 engage the inner annular face of the brake drum 17 and connect the same with the rotary means 18 so that all rotary parts form a unit rotating at the same speed. Since the centrifugal force acting on the weights 1 increases with the rotary speed of the engine and of the drive shaft 22, the brake drum 17 is coupled by the friction members 1 to the rotary means 18 by a force which increases with the rotary speed.

When the rotary speed drops, the force exerted by the return springs 2 is greater than the centrifugal force so that the centrifugal means 1, 19 are retracted inwardly, and the rollers 20 are pressed against the curved edge of the cam slot 4 so that the annular member 3 tends to turn in an opposite direction.

When the vehicle continues to move at a gradually reduced rotary speed of the engine until the number of revolutions drops below the value required for coupling, the rollers 20 move in tangential direction out of the recessed portion in the cam slot 4 whereby the centrifugal means 19, 1 are inwardly moved so the brake shoes 1 release the brake drum 17. In this position, the rotary means 18 is separated from the brake drum 17.

Turning of the annular cam means 3 results in pivoting of the supporting lever 6 whereby the distance of the planetary shafts 8 from the shafts 26 is changed. A position of the friction discs 7 with respect to the friction discs 9 is maintained which depends on the equilibrium between the centrifugal force and the force of the return springs 2.

The effective radius of the conical friction discs 7 and thereby the transmission ratio is consequently adapted to the rotary speed of the drive.

Due to the conical shape of the friction discs 7, the rim friction discs 9 must separate in axial direction to a great extent when the inner thicker portion of the friction discs 7 are engaged by the friction rims 10. Since both sets of friction discs 7 and 9 are arranged slidable in axial direction on their respective shafts, the required spacing is automatically obtained by the pressure members 29 and 27.

In the event that the vehicle is at a standstill and that the engine rotates at a low number of revolutions, the effective radius of the friction discs 7 is greater than the effective radius $X_0$ so that the internal gear 17' turns in the same direction of rotation as the drive shaft 22. If the brake drum 17 is blocked in this operational condition of the drive by tightening the brake band 42 the driven shaft 26 will turn in the direction opposite to the direction of rotation of the drive shaft 22 and the vehicle will move in rearward direction.

However, an increase of the engine speed will not increase the speed of rearward movement of the vehicle since the increasing centrifugal force of the centrifugal means 19, 1 effects movement of the friction discs 7 to an inner position so that the vehicle stops, and even moves again in forward direction when the rotary speed of the engine shaft is further increased, since the effective radius $X_0$ is reached, or passed. The lower the speed of the engine shaft, the faster is the reverse speed of the vehicle.

Figure 11:
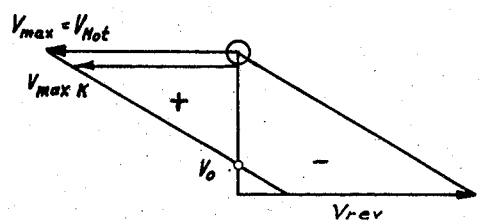
Fig. 11 is a diagram illustrating the speed vectors.

In Fig. 11, $V_{max}$ represents the greatest speed; $V_{mot}$ represents the speed of the motor; $V_{max}K$ represents the maximum variable speed; $V_0$ represents zero speed; and $V_{rev}$ represents speed in reverse direction.

In the illustrated and described embodiment of the present invention, conical discs are provided on the planetary shafts, and friction discs having friction rims are provided on the driven shaft. It will be understood that the friction drive according to the present invention will operate in substantially the same manner if the friction discs on the driven shaft are conical discs and the friction discs on the planetary shafts have friction rims.

It will be understood that each of the elements described above, or two or more together, may also find a useful application in other types of automatic friction drives differing from the types described above.

While the invention has been illustrated and described as embodied in a gradually variable epicyclic friction drive operated by centrifugal means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Gradually variable epicyclic friction drive comprising, in combination, first rotary means; second rotary means; sun friction disc means connected for rotation to said first rotary means; planetary friction disc means meshing with said sun friction disc means; shiftable supporting means supporting said planetary friction disc means on said second rotary means spaced from the axis of rotation of the same and shiftable with respect to said sun friction disc means for gradually changing the ratio of transmission between said sun friction disc means and said planetary friction disc means; transmission means connected for rotation to said planetary friction disc means and including an orbit gear means; blocking means for blocking rotation of said orbit gear means in one direction; and movable operating means including movable centrifugal weight means mounted on said second rotary means and being connected to said movable supporting means for shifting the same whereby the ratio of transmission between said sun friction disc means and said planetary friction disc means is changed in accordance with the rotary speed of said second rotary means.

2. Gradually variable epicyclic friction drive comprising, in combination, first rotary means; second rotary means; sun friction disc means connected for rotation to said first rotary means; planetary friction disc means meshing with said sun friction disc means; shiftable supporting means supporting said planetary friction disc means on said second rotary means spaced from the axis of rotation of the same and shiftable with respect to said sun friction disc means for gradually changing the ratio of transmission between said sun friction disc means and said planetary friction disc means; transmission means connected for rotation to said planetary friction disc means and including an orbit gear means; blocking means for blocking rotation of said orbit gear means; and movable operating means including movable centrifugal weight means mounted on said second rotary means and being connected to said movable supporting means for shifting the same whereby the ratio of transmission between said sun friction disc means and said planetary friction disc means is changed in accordance with the rotary speed of said second rotary means, said centrifugal weight means engaging said orbit gear means at a predetermined rotary speed of said second rotary means for coupling said sun wheel means to said second rotary means.

3. Gradually variable epicyclic friction drive comprising, in combination, first rotary means; second rotary means; sun friction disc means connected for rotation to said first rotary means; planetary friction disc means meshing with said sun friction disc means; shiftable supporting means supporting said planetary friction disc means on said second rotary means spaced from the axis of rotation of the same and shiftable with respect to said sun friction disc means for gradually changing the ratio of transmission between said sun friction disc means and said planetary friction disc means; transmission means connected for rotation to said planetary friction disc means and including an orbit gear means; blocking means for blocking rotation of said orbit gear means; and movable operating means including movable centrifugal weight means mounted on said second rotary means and being connected to said movable supporting means for shifting the same and further including return spring means connected to said centrifugal weight means and urging the same inwardly whereby the ratio of transmission between said sun friction disc means and said planetary friction disc means is changed in accordance with the rotary speed of said second rotary means.

4. Gradually variable epicyclic friction drive comprising, in combination, rotary driven means; rotary drive means; sun friction disc means connected for rotation to said rotary driven means; planetary friction disc means meshing with said sun friction disc means; shiftable supporting means supporting said planetary friction disc means on said rotary drive means spaced from the axis of rotation of the same and shiftable with respect to said sun friction disc means for gradually changing the ratio of transmission between said sun friction disc means and said planetary friction disc means; planet gear means supported on said movable supporting means and connected for rotation to said planetary friction disc means; orbit gear means meshing with said planetary gear means; blocking means for blocking rotation of said orbit gear means in one direction; and movable operating means including movable centrifugal weight means mounted on said rotary drive means and being connected to said movable supporting means for shifting the same whereby the ratio of transmission between said sun friction disc means and said planetary friction disc means is changed in accordance with the rotary speed of said rotary drive means.

5. Gradually variable epicyclic friction drive comprising, in combination, rotary driven means; rotary drive means; sun friction disc means connected for rotation to said rotary driven means; planetary friction disc means meshing with said sun friction disc means; shiftable supporting means supporting said planetary friction disc means on said rotary drive means spaced from the axis of rotation of the same and shiftable with respect to said sun friction disc means for gradually changing the ratio of transmission between said sun friction disc means and said planetary friction disc means; planet gear means supported on said movable supporting means and connected for rotation to said planetary friction disc means; orbit gear means meshing with said planetary gear means; blocking means for blocking rotation of said orbit gear means in one direction; and movable operating means including movable centrifugal weight means mounted on said rotary drive means and being connected to said movable supporting means for shifting the same and further including return spring means connected to said centrifugal weight means and urging the same inwardly whereby the ratio of transmission between said sun friction disc means and said planetary friction disc means is changed in accordance with the rotary speed of said rotary drive means, said centrifugal weight means engaging said orbit gear means at a predetermined rotary speed of said rotary drive means for coupling said orbit gear means to said rotary drive means, and releasing said orbit gear means at a lower predetermined speed due to the action of said return spring means.

6. Gradually variable epicyclic friction drive comprising, in combination, first rotary means; second rotary means; sun friction disc means connected for rotation to said first rotary means; planetary friction disc means meshing with said sun friction disc means; shiftable supporting means supporting said planetary friction disc means on said second rotary means spaced from the axis of rotation of the same and shiftable with respect to said sun friction disc means for gradually changing the ratio of transmission between said sun friction disc means and said planetary friction disc means; transmission means connected for rotation to said planetary friction disc means and including an orbit gear means; blocking means for blocking rotation of said orbit gear means in one direction; radially extending guide means on said second rotary means; centrifugal weight means including guide members guided in said guide means; return spring means attached to said guide members and urging the same and said centrifugal weight means inwardly; and means connecting said guide members with said shiftable supporting means for shifting the same whereby the ratio of transmission between said sun friction disc means and said planetary friction disc means is changed in accordance with the rotary speed of said second rotary means.

7. Gradually variable epicyclic friction drive comprising, in combination, first rotary means; second rotary means; sun friction disc means connected for rotation to said first rotary means; planetary friction disc means meshing with said sun friction disc means; shiftable supporting means supporting said planetary friction disc means on said second rotary means spaced from the axis of rotation of the same and shiftable with respect to said sun friction disc means for gradually changing the ratio of transmission between said sun friction disc means and said planetary friction disc means; transmission means connected for rotation to said planetary friction disc means and including an orbit gear means; blocking means for blocking rotation of said orbit gear means in one direction; radially extending guide means on said second rotary means; centrifugal weight means including guide members guided in said guide means; return spring means attached to said guide members and urging the same and said centrifugal weight means inwardly; a cam means mounted on said second rotary means for turning movement about the axis of rotation of the same; cam follower means secured to said centrifugal means and cooperating with said cam means so that said cam means is turned corresponding to the radial movement of said centrifugal weight means; and means connecting said turnable cam means with said shiftable supporting means for shifting the same whereby the ratio of transmission between said sun friction disc means and said planetary friction disc means is changed in accordance with the rotary speed of said second rotary means.

8. Gradually variable epicyclic friction drive as claimed in claim 7 wherein said shiftable supporting means include a plurality of pins mounted on said second rotary means parallel to the axis of rotation of the same; supporting lever means turnably mounted on each of said pins and including first and second lever arms; a planetary shaft mounted on each of said first lever arms and supporting said planetary friction disc means for turning movement therewith; a slide member pivotally mounted on the free end of each of said second lever arms; and wherein said cam means includes an annular member formed with radial slots receiving said pivoted slide members.

9. Gradually variable epicyclic friction drive as claimed in claim 8 wherein said transmission means include a plurality of first planet gears, each first planet gear being fixed on one of said planetary shafts; a plurality of second planet gears, each second planet gear being mounted turnably on one of said pins and meshing with an associated first planet gear; and wherein said orbit gear means includes an internal gear means meshing with said second planet gears.

10. Gradually variable epicyclic friction drive as claimed in claim 9 wherein one of said friction disc means consists of friction discs having conical side faces; and wherein the other of said friction disc means consists of friction discs having friction rims frictionally engaging said conical side faces.

11. Gradually variable epicyclic friction drive as claimed in claim 9 wherein said planetary friction disc means consists of friction discs having conical side faces; wherein said sun friction disc means consists of discs having friction rims frictionally engaging said conical side faces; and wherein said supporting lever means shift said planetary friction disc means to a position in which said friction rims of said sun friction disc means are located closest to the axis of rotation of said planetary friction disc means when said centrifugal weight means are in their outermost position.

12. Gradually variable epicyclic friction drive as claimed in claim 11 wherein said orbit gear means include a hollow drum, and wherein said centrifugal weight means include friction members attached to the outer ends of said guide members and being located within said drum and frictionally engaging the same at a predetermined rotary speed of said second rotary means for coupling said orbit gear means to said second rotary means.

13. Gradually variable epicyclic friction drive comprising, in combination, first rotary means; second rotary means; sun friction disc means connected for rotation to said first rotary means; planetary friction disc means meshing with said sun friction disc means; shiftable supporting means supporting said planetary friction disc means on said second rotary means spaced from the axis of rotation of the same and shiftable with respect to said sun friction disc means for gradually changing the ratio of transmission between said sun friction disc means and said planetary friction disc means; transmission means connected for rotation to said planetary friction disc means and including an orbit gear means; a brake drum connected for rotation to said orbit gear means; brake band means passing around said brake drum and blocking rotation of the same in one direction while permitting rotation in opposite direction; radially extending guide means on said second rotary means; centrifugal weight means including guide members guided in said guide means and friction members secured to the outer ends of said guide members and being located within said brake drum, said friction members frictionally engaging said brake drum at a predetermined rotary speed of said second rotary means for connecting the latter to said orbit gear means; return spring means attached to said guide members for moving the same and said centrifugal weight means inwardly; and means connecting said guide members with said shiftable supporting means for shifting the same whereby the transmission ratio between said sun friction disc means and said planetary friction disc means is changed in accordance with the rotary speed of said second rotary means.

14. Gradually variable epicyclic friction drive comprising, in combination, first rotary means; second rotary means adapted to be driven in one direction of rotation by a motor; sun friction disc means connected for rotation to said first rotary means and including at least one set of friction discs; planetary friction disc means including at least one set of friction discs, one of said sets of friction discs having conical friction side faces, and the other of said sets of friction discs having friction rims frictionally engaging said conical friction side faces; shiftable supporting means supporting said planetary friction disc means on said second rotary means spaced from the axis of rotation of the same shiftable with respect to said sun friction disc means for gradually changing the radial distance from the axis of rotation of said one of the said sets of friction disc means to said friction rims of said other of said friction disc means whereby the ratio of transmission between said sun friction disc means and said planetary friction disc means is gradually changed; planet gear means connected for rotation to said planetary friction disc means; rotary orbit gear means meshing with said planet gear means; blocking means for blocking rotation of said orbit gear means; and movable operating means connected to said movable supporting means for shifting the same, and thereby said planetary friction disc means between a first position in which said orbit gear means rotates in said one direction and in the same direction as said second rotary means, a second intermediate position in which said planet gear means do not turn relative to said orbit gear means, and a third position in which said planet gear means roll on said orbit gear means in a direction opposite to the direction of rotation of said second rotary means when said sun gear means is blocked.

15. Gradually variable epicyclic friction drive comprising, in combination, first rotary means; second rotary means adapted to be driven in one direction of rotation by a motor; sun friction disc means connected for rotation to said first rotary means and including at least one set of friction discs; planetary friction disc means including at least one set of friction discs, one of said sets of friction discs having conical friction side faces, and the other of said sets of friction discs having friction rims frictionally engaging said conical friction side faces; shiftable supporting means supporting said planetary friction disc means on said second rotary means spaced from the axis of rotation of the same shiftable with respect to said sun friction disc means for gradually changing the radial distance from the axis of rotation of said one of the said sets of friction disc means to said friction rims of said other of said friction disc means whereby the ratio of transmission between said sun friction disc means and said planetary friction disc means is gradually changed; planet gear means connected for rotation to said planetary friction disc means; rotary orbit gear means meshing with said planet gear means; blocking means for blocking rotation of said orbit gear means in direction opposite to said one direction; and movable operating means including movable centrifugal weight means mounted for radial movement on said second rotary means and being connected to said movable supporting means for shifting the same, and thereby said planetary friction disc means between a first position in which said orbit gear means rotates in said one direction and in the same direction as said second rotary means, a second intermediate position in which said planet gear means do not turn relative to said orbit gear means, and a third position in which said planet gear means tend to rotate said orbit gear means in a direction opposite to the direction of rotation of said second rotary means so that said blocking means block said orbit gear means and said planetary friction gear means roll on said orbit gear means and thereby rotate said first rotary means.

16. Gradually variable epicyclic friction drive comprising, in combination, first rotary means; second rotary means adapted to be driven in one direction of rotation by a motor; sun friction disc means connected for rotation to said first rotary means and including at least one set of friction discs; planetary friction disc means including at least one set of friction discs, one of said sets of friction discs having conical friction side faces, and the other of said sets of friction discs having friction rims frictionally engaging said conical friction side faces; shiftable supporting means supporting said planetary friction disc means on said second rotary means spaced from the axis of rotation of the same shiftable with respect to said sun friction disc means for gradually changing the radial distance from the axis of rotation of said one of the said sets of friction disc means to said friction rims of said other of said friction disc means whereby the ratio of transmission between said sun friction disc means and said planetary friction disc means is gradually changed; planet gear means connected for rotation to said planetary friction disc means; rotary orbit gear means meshing with said planet gear means; blocking means for blocking rotation of said orbit gear means in direction opposite to said one direction; and movable operating means including movable centrifugal weight means mounted for radial movement of said second rotary means and being connected to said movable supporting means for shifting the same, and thereby said planetary friction disc means between a first position in which said orbit gear means rotates in said one direction and in the same direction as said second rotary means, a second intermediate position in which said planet gear means do not turn relative to said sun gear means, and a third position in which said planet gear means tend to rotate said orbit gear means in a direction opposite to the direction of rotation of said second rotary means so that said blocking means block said orbit gear means and said planetary friction gear means roll on said orbit gear means and thereby rotate said first rotary means, said centrifugal weight means being located within said rotary orbit gear means and engaging the same at a predetermined rotary speed of said second rotary means for coupling said second rotary means to said orbit gear means.

17. Gradually variable epicyclic friction drive comprising, in combination, first rotary means; second rotary means adapted to be driven in one direction of rotation by a motor; sun friction disc means connected for rotation to said first rotary means and including at least one set of friction discs; planetary friction disc means including at least one set of friction discs, one of said sets of friction discs having conical friction side faces, and the other of said sets of friction discs having friction rims frictionally engaging said conical friction side faces; shiftable supporting means supporting said planetary friction disc means on said second rotary means spaced from the axis of rotation of the same shiftable with respect to said sun friction disc means for gradually changing the radial distance from the axis of rotation of said one of the said sets of friction disc means to said friction rims of said other of said friction disc means whereby the ratio of transmission between said sun friction disc means and said planetary friction disc means is gradually changed; planet gear means connected for rotation to said planetary friction disc means; rotary orbit gear means meshing with said planet gear means; blocking means for blocking rotation of said orbit gear means in direction opposite to said one direction; and movable operating means including movable centrifugal weight means mounted for radial movement on said second rotary means and return spring means attached to said centrifugal weight means and urging the same in inward direction, said centrifugal weight means being connected to said movable supporting means for shifting the same, and thereby said planetary friction disc means between a first position in which said orbit gear means rotates in said one direction and in the same direction as said second rotary means, a second intermediate position in which said planet gear means do not turn relative to said orbit gear means, and a third position in which said planet gear means tend to rotate said sun gear means in a direction opposite to the direction of rotation of said second rotary means so that said blocking means block said orbit gear means and said planetary friction gear means roll on said orbit gear means and thereby rotate said first rotary means.

18. Gradually variable epicyclic friction drive comprising, in combination, first rotary means; second rotary means adapted to be driven in one direction of rotation by a motor; sun friction disc means connected for rotation to said first rotary means and including at least one set of friction discs; planetary friction disc means including at least one set of friction discs, one of said sets of friction discs having conical friction side faces, and the other of said sets of friction discs having friction rims frictionally engaging said conical friction side faces; shiftable supporting means supporting said planetary friction disc means on said second rotary means spaced from the axis of rotation of the same shiftable with respect to said sun friction disc means for gradually changing the radial distance from the axis of rotation of said one of the said sets of friction disc means to said friction rims of said other of said friction disc means whereby the ratio of transmission between said sun friction disc means and said planetary friction disc means is gradually changed; planet gear means connected for rotation to said planetary friction disc means; rotary orbit gear means meshing with said planet gear means; blocking means for blocking rotation of said orbit gear means in direction opposite to said one direction; and movable operating means including movable centrifugal weight means mounted for radial movement on said second rotary means and return spring means attached to said centrifugal weight means and urging the same in inward direction, said centrifugal weight means being connected to said movable supporting means for shifting the same, and thereby said planetary friction disc means between a first position in which said orbit gear means rotates in said one direction and in the same direction as said second rotary means, a second intermediate position in which said planet gear means do not turn relative to said orbit gear means, and a third position in which said planet gear means tend to rotate said orbit gear means in a direction opposite to the direction of rotation of said second rotary means so that said blocking means block said orbit gear means and said planetary friction gear means roll on said orbit gear means and thereby rotate said first rotary means, said centrifugal weight means being located within said rotary orbit gear means and engaging the same at a predetermined rotary speed of said second rotary means for coupling said second rotary means to said orbit gear means.

19. Gradually variable epicyclic friction drive comprising, in combination, first rotary means; second rotary means adapted to be driven in one direction of rotation by a motor; sun friction disc means connected for rotation to said first rotary means and including at least one set of friction discs; planetary friction disc means including at least one set of friction discs, one of said sets of friction discs having conical friction side faces, and the other of said sets of friction discs having friction rims frictionally engaging said conical friction side faces; shiftable supporting means supporting said planetary friction disc means on said second rotary means spaced from the axis of rotation of the same and shiftable with respect to said sun friction disc means for gradually changing the radial distance from the axis of rotation of said one of the said sets of friction disc means to said friction rims of said other of said friction disc means whereby the ratio of transmission between said sun friction disc means and said planetary friction disc means is gradually changed; planet gear means connected for rotation to said planetary friction disc means; rotary orbit gear means meshing with said planet gear means; blocking means for blocking rotation of said orbit gear means in direction opposite to said one direction; and movable operating means including movable centrifugal weight means mounted for radial movement on said second rotary means, return spring means attached to said centrifugal weight means and urging the same in inward direction, a cam follower secured to said centrifugal weight means, cam means turnably mounted on said second rotary means and being engaged and turned by said cam follower corresponding to the position of said centrifugal weight means, and means connecting said cam means with said movable supporting means for shifting the same in accordance with the position of said centrifugal weight means whereby said planetary friction disc means are shifted between a first position in which said orbit gear means rotates in said one direction and in the same direction as said second rotary means, a second intermediate position in which said planet gear means do not turn relative to said orbit gear means, and a third position in which said planet gear means tend to rotate said orbit gear means in a direction opposite to the direction of rotation of said second rotary means so that said blocking means block said orbit gear means and said planetary friction gear means roll on said orbit gear means and thereby rotate said first rotary means.

References Cited in the file of this patent

UNITED STATES PATENTS

| | | |
|---|---|---|
| 1,370,080 | Ahond | Mar. 1, 1921 |
| 1,655,079 | Weiss | Jan. 3, 1928 |
| 2,222,281 | Beier | Nov. 19, 1940 |